United States Patent
Mushiga et al.

(10) Patent No.: US 10,279,678 B2
(45) Date of Patent: May 7, 2019

(54) PROTECTIVE STRUCTURE FOR FUEL PUMP

(71) Applicant: TOYOTA JIDOSHA KABUSHIKI KAISHA, Toyota-shi, Aichi-ken (JP)

(72) Inventors: Kentaro Mushiga, Okazaki (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/875,351

(22) Filed: Jan. 19, 2018

(65) Prior Publication Data

US 2018/0208051 A1    Jul. 26, 2018

(30) Foreign Application Priority Data

Jan. 23, 2017   (JP) .................. 2017-009375

(51) Int. Cl.
| | |
|---|---|
| *B60K 15/01* | (2006.01) |
| *F02M 39/00* | (2006.01) |
| *F02M 59/44* | (2006.01) |
| *F02M 53/04* | (2006.01) |
| *B60K 15/03* | (2006.01) |

(52) U.S. Cl.
CPC ............ *B60K 15/01* (2013.01); *F02M 39/00* (2013.01); *F02M 39/005* (2013.01); *F02M 59/44* (2013.01); *B60K 2015/03243* (2013.01); *B60K 2015/03421* (2013.01); *B60Y 2306/01* (2013.01); *B60Y 2410/114* (2013.01); *F02M 53/046* (2013.01); *F02M 2200/00* (2013.01); *F02M 2200/185* (2013.01); *F02M 2200/85* (2013.01)

(58) Field of Classification Search
CPC .......... B60K 15/01; B60K 2015/03243; F02M 53/046; F02M 39/00; F02M 39/005; F02M 37/22; F02M 59/44
See application file for complete search history.

(56) References Cited

FOREIGN PATENT DOCUMENTS

JP        2007-321656 A       12/2007

OTHER PUBLICATIONS

"Jalopy Journal" Post from Jun. 24, 2008 . . . <https://www.jalopyjournal.com/forum/threads/holley-electric-fuel-pump-qs.274474/>.*

* cited by examiner

*Primary Examiner* — Jacob M Amick
(74) *Attorney, Agent, or Firm* — Oliff PLC

(57) ABSTRACT

A protective structure for a fuel pump includes a protector including a connecting wall, a first protective wall, and a second protective wall. The first protective wall and the second protective wall are disposed outside the fuel pump assembled to an internal combustion engine. A standing surface of the second protective wall on a side opposite to a second base end surface in a standing direction of the second protective wall includes a curved surface that is concave on the second base end surface side and that becomes closer to the second base end surface side as the curved surface becomes farther from the first protective wall.

5 Claims, 4 Drawing Sheets

US 10,279,678 B2

PROTECTIVE STRUCTURE FOR FUEL PUMP

INCORPORATION BY REFERENCE

The disclosure of Japanese Patent Application No. 2017-009375 filed on Jan. 23, 2017 including the specification, drawings and abstract is incorporated herein by reference in its entirety.

BACKGROUND

1. Technical Field

The present disclosure relates to a protective structure for a fuel pump.

2. Description of Related Art

Japanese Unexamined Patent Application Publication No. 2007-321656 (JP 2007-321656 A) discloses a protective structure provided with a protector as a protective structure protecting a fuel pump. The fuel pump has a housing portion accommodating a plunger. The protector is formed in a columnar shape and extends to the rear of a vehicle from the housing portion of the fuel pump. During a collision of the vehicle, for example, the protector is also moved along with the fuel pump as its internal combustion engine is moved. The protector extends to the rear of the vehicle beyond the housing portion of the fuel pump and comes into contact with a member disposed behind the internal combustion engine. In this manner, contact of the member disposed behind the internal combustion engine with the fuel pump is suppressed.

SUMMARY

In the aspect of the collision of the vehicle, the direction in which the internal combustion engine is moved varies. Accordingly, members disposed to the side of or behind the internal combustion engine may interfere with the fuel pump. It cannot be said that the protector disclosed in JP 2007-321656 A is capable of suppressing interference between the fuel pump and the member disposed to the side of the internal combustion engine although the protector is capable of suppressing interference between the fuel pump and the member disposed behind the internal combustion engine. The protector may be provided with a protective wall covering the rear and sides of the fuel pump. In a case where a protective wall that has an L-shaped cross section and is divided into rear and side walls is applied to the protector, interference between the fuel pump and the member disposed to the side of the internal combustion engine as well as the member disposed behind the internal combustion engine is suppressed. During contact with the members disposed around the internal combustion engine, a load acting on the rear wall of the protective wall covering the rear of the fuel pump is received by the side walls of the protective wall covering the sides of the fuel pump and a load acting on the side walls of the protective wall covering the sides of the fuel pump is received by the rear wall of the protective wall covering the rear of the fuel pump. It cannot be said, however, that sufficient research has been conducted on how stress is generated in the protective wall when the load acting on the protective wall is received. Therefore, the present disclosure provides a protective structure for a fuel pump with which the durability of a protector can be further improved based on such research.

An aspect of the present disclosure relates to a protective structure for a fuel pump. The protective structure includes a protector including a connecting wall connected to an internal combustion engine, a first protective wall standing on the connecting wall with a first base end surface on the connecting wall side extending in a first direction, and a second protective wall standing on the connecting wall with a second base end surface on the connecting wall side extending from a first end portion of the first protective wall in a second direction intersecting with the first direction. The first protective wall and the second protective wall are disposed outside the fuel pump assembled to the internal combustion engine. A standing surface of the second protective wall on a side opposite to the second base end surface in a standing direction of the second protective wall includes a first curved surface that is concave on the second base end surface side and that becomes closer to the second base end surface side as the curved surface becomes farther from the first protective wall.

In the configuration described above, the standing surface includes the first curved surface formed in a curved shape, and thus stress can be dispersed to the standing surface as well as the second base end surface of the second protective wall when a load acting on the first protective wall is received by the second protective wall. Accordingly, with the configuration described above, stress concentration on a part of the second protective wall can be suppressed and the durability of the protector can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
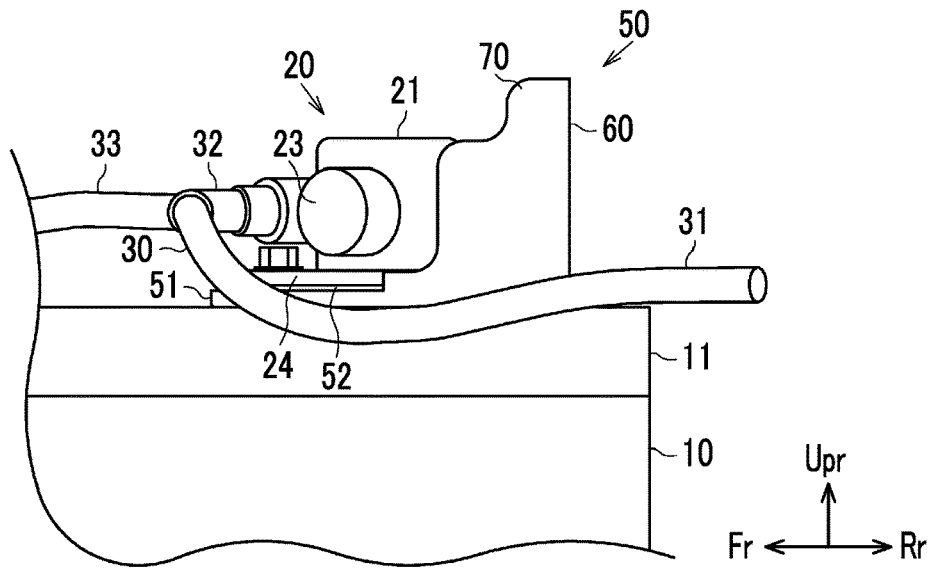
FIG. 1 is a side view schematically illustrating a configuration of an embodiment of a protective structure for a fuel pump.

Hereinafter, an embodiment of a protective structure for a fuel pump will be described with reference to FIGS. 1 to 5. In the drawings, "Fr" represents the front of a vehicle, "Rr" represents the rear of the vehicle, "RH" represents the right-hand side in the width direction of the vehicle with respect to the front of the vehicle, "LH" represents the left-hand side in the width direction of the vehicle with respect to the front of the vehicle, and "Upr" represents the upper part of the vehicle. Each of "Fr", "Rr", "RH", "LH", and "Upr" is indicated by the direction of an arrow.

As illustrated in FIG. 1, an internal combustion engine to which the fuel pump is assembled has a cylinder head 10. The cylinder head 10 supports a camshaft (not illustrated)

for driving intake and exhaust valves of the internal combustion engine. A cylinder head cover 11 is connected to the upper end of the cylinder head 10.

Figure 2:
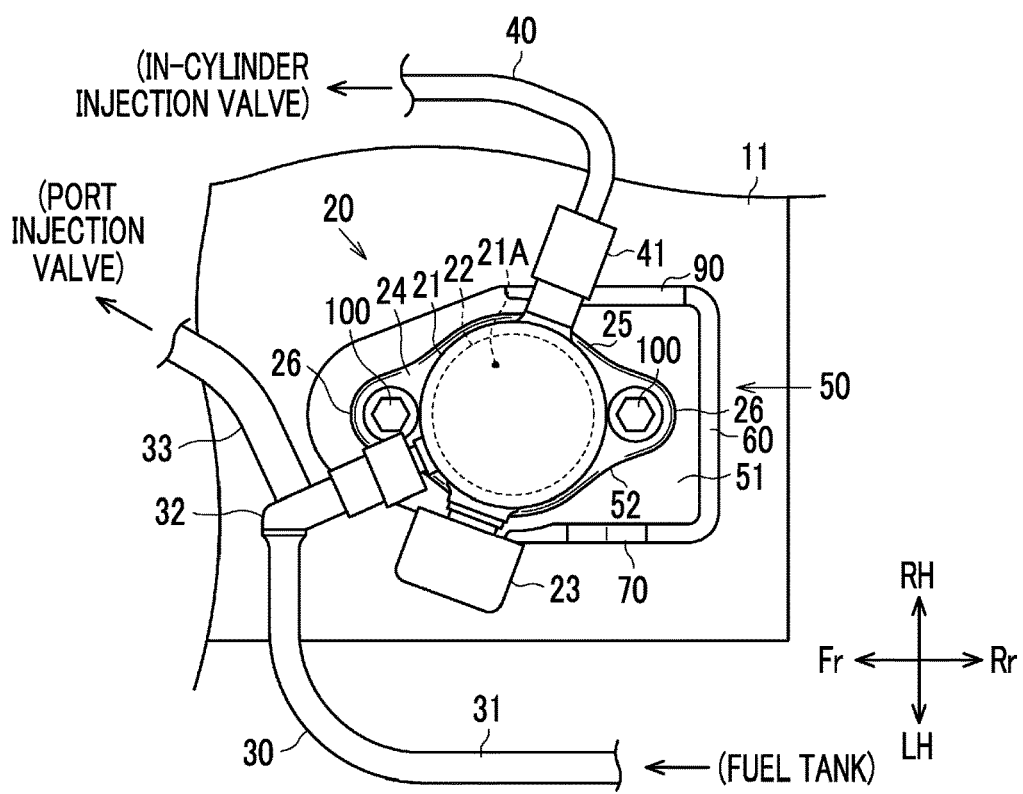
FIG. 2 is a plan view schematically illustrating the configuration of the embodiment illustrated in FIG. 1.

As illustrated in FIG. 2, a fuel pump 20 is fixed to the end portion of the cylinder head cover 11 that is on the rear side of the vehicle and the left-hand side in the width direction of the vehicle. The fuel pump 20 has an accommodating body 21 in which a plunger 22 is slidably accommodated. The accommodating body 21 is formed in the shape of a cylinder that has a lid. A pressurizing chamber 21A is disposed in the accommodating body 21. The inner wall of the accommodating body 21 and the top surface of the plunger 22 constitute the pressurizing chamber 21A. The plunger 22 moves upward and downward as the camshaft rotates. As a result, the volume of the pressurizing chamber 21A changes. A low-pressure fuel pipe 30 is connected to the accommodating body 21. The low-pressure fuel pipe 30 has a supply pipe 31 and a communication pipe 32. One end of the supply pipe 31 is connected to a fuel tank. The communication pipe 32 allows the supply pipe 31 and the accommodating body 21 to communicate with each other. The low-pressure fuel pipe 30 also has an introduction pipe 33. A first end of the introduction pipe 33 is connected to the communication pipe 32 and a second end of the introduction pipe 33 is connected to a port injection valve (not illustrated) of the internal combustion engine. A feed pump (not illustrated) is disposed on the path of the supply pipe 31. A fuel that is suctioned from the fuel tank by the feed pump flows through the supply pipe 31 and the communication pipe 32 and is supplied to the pressurizing chamber 21A of the accommodating body 21. The fuel pump 20 also has a spill valve 23 connected to the accommodating body 21. The spill valve 23 is an electromagnetic control valve that allows the communication pipe 32 and the pressurizing chamber 21A to communicate with each other or blocks the communication depending on the state of energization.

A high-pressure fuel pipe 40 is also connected to the accommodating body 21. A first end of the high-pressure fuel pipe 40 communicates with the pressurizing chamber 21A and a second end of the high-pressure fuel pipe 40 is connected to an in-cylinder injection valve (not illustrated) of the internal combustion engine. A check valve 41 is disposed on the high-pressure fuel pipe 40. When the pressure in the pressurizing chamber 21A reaches a pressure that is equal to or higher than a predetermined pressure, the check valve 41 is opened and the flow of the fuel from the pressurizing chamber 21A to the high-pressure fuel pipe 40 is allowed. When the pressure in the pressurizing chamber 21A is lower than the predetermined pressure, the check valve 41 is closed and the flow of the fuel from the pressurizing chamber 21A to the high-pressure fuel pipe 40 is prohibited.

In the fuel pump 20, the amount of the fuel that is discharged to the high-pressure fuel pipe 40 is adjusted by the energization of the spill valve 23 being controlled. In other words, the low-pressure fuel pipe 30 and the pressurizing chamber 21A communicate with each other in a state where the spill valve 23 is open when the plunger 22 is lowered. In this state, the fuel is suctioned from the low-pressure fuel pipe 30 to the pressurizing chamber 21A as the volume of the pressurizing chamber 21A increases by the plunger 22 being lowered.

During a subsequent rise of the plunger 22, the spill valve 23 is closed and the communication between the pressurizing chamber 21A and the low-pressure fuel pipe 30 is blocked. In this state, the fuel in the pressurizing chamber 21A is compressed as the volume of the pressurizing chamber 21A is decreased by the rising plunger 22. Once the pressure of the fuel in the pressurizing chamber 21A reaches the pressure that is equal to or higher than the predetermined pressure, the check valve 41 disposed on the high-pressure fuel pipe 40 is opened and the pressurizing chamber 21A and the high-pressure fuel pipe 40 communicate with each other. As a result, the fuel is discharged from the pressurizing chamber 21A to the high-pressure fuel pipe 40 and the high-pressure fuel is supplied to the in-cylinder injection valve. The fuel suctioned to the pressurizing chamber 21A can be discharged back to the low-pressure fuel pipe 30 when the pressurizing chamber 21A and the low-pressure fuel pipe 30 continue to communicate with each other by the spill valve 23 maintaining its open state for a while after the beginning of the rise of the plunger 22. Then, the amount of the fuel that is compressed in the pressurizing chamber 21A is adjusted. The fuel that flows through the low-pressure fuel pipe 30, which includes the fuel that returns from the pressurizing chamber 21A, is supplied to the port injection valve through the introduction pipe 33.

As illustrated in FIGS. 1 and 2, the accommodating body 21 has a lower end portion to which a flange 24 is connected. The flange 24 has an annular portion 25 extending outward from the peripheral edge of the lower end opening of the accommodating body 21 and formed in an annular shape in the plan view that is illustrated in FIG. 2. Extending piece portions 26 extending outward in the front-rear direction of the vehicle are connected to both end portions of the annular portion 25 in the front-rear direction of the vehicle (right-left direction in FIG. 2). A bolt insertion hole is formed in each of the extending piece portions 26. A protector 50 is sandwiched between the lower surface of the flange 24 and the upper surface of the cylinder head cover 11. The protector 50 is a member constituting the protective structure for the fuel pump 20.

Figure 3:
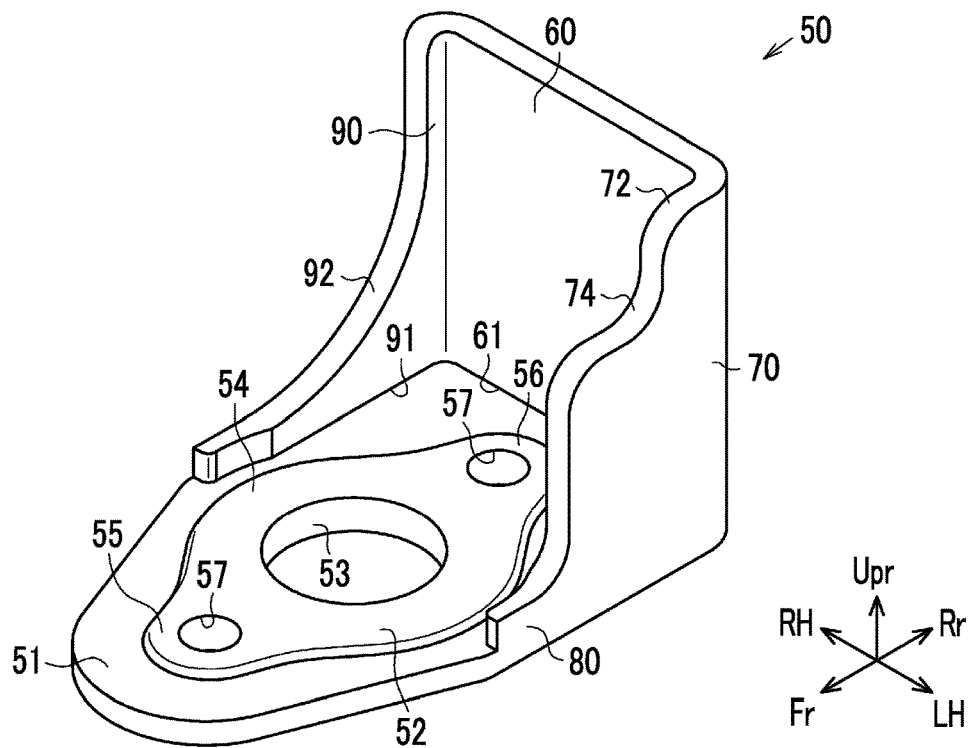
FIG. 3 is a perspective view schematically illustrating a configuration of a protector.

The protector 50 has a connecting wall 51 as illustrated in FIG. 3. The connecting wall 51 is formed in a plate shape. In plan view, the rear part of the connecting wall 51 in the front-rear direction of the vehicle is formed in a quadrangular shape and the front part of the connecting wall 51 in the front-rear direction of the vehicle is formed in the shape of a triangle tapered toward the front side of the vehicle as illustrated in FIG. 2. A pedestal 52 is disposed on the upper surface of the connecting wall 51 as illustrated in FIG. 3. The pedestal 52 bulges upward in comparison to the other parts on the upper surface of the connecting wall 51. A through-hole 53 penetrating the pedestal 52 is formed in the connecting wall 51. The pedestal 52 has an annular middle portion 54, a front piece portion 55, and a rear piece portion 56. The middle portion 54 is disposed around the through-hole 53. The front piece portion 55 extends to the front of the vehicle from the front end portion of the middle portion 54. The rear piece portion 56 extends to the rear of the vehicle from the rear end portion of the middle portion 54. Bolt holes 57 are formed in the front piece portion 55 and the rear piece portion 56. The respective upper surfaces of the middle portion 54, the front piece portion 55, and the rear piece portion 56 of the pedestal 52 are flush with one another. The upper surface of the pedestal 52 is formed in a flat plate shape.

The protector 50 has a first protective wall 60, a second protective wall 70, and a third protective wall 90 standing on the connecting wall 51. The first protective wall 60 is formed in a rectangular plate shape. The first protective wall 60 has a first base end surface 61 on the connecting wall 51 side and the first base end surface 61 extends in the width direction of the vehicle as a first direction. The second protective wall 70 is formed in a plate shape and is connected to the left end portion of the first protective wall 60.

Figure 4:
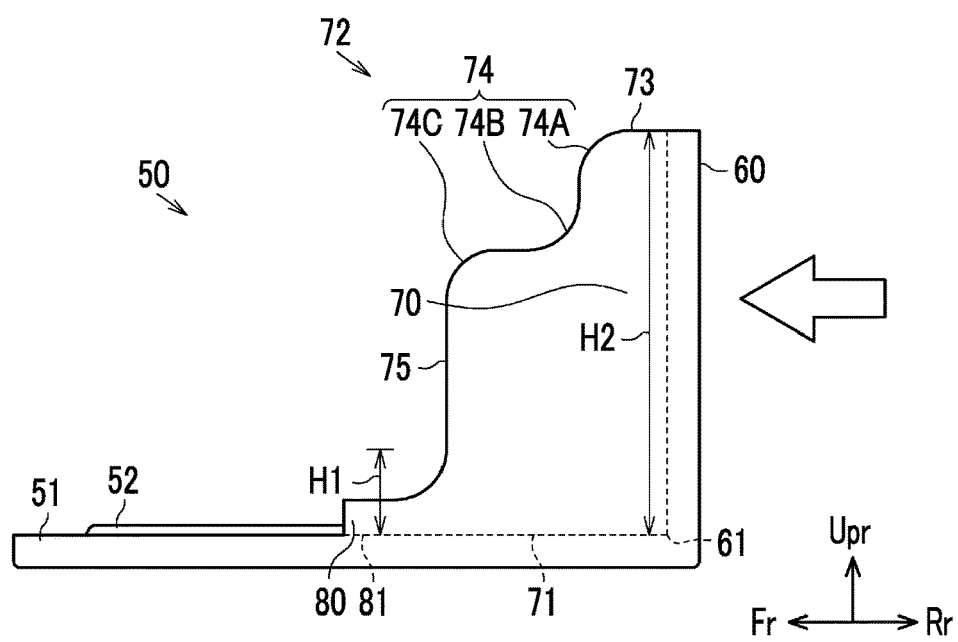
FIG. 4 is a left side view of the protector illustrated in FIG. 3.

The second protective wall 70 has a second base end surface 71 on the connecting wall 51 side and the second base end surface 71 extends from the left end portion of the first protective wall 60 in the front-rear direction of the vehicle (right-left direction in FIG. 4) as illustrated in FIG. 4. The front-rear direction of the vehicle in which the second base end surface 71 extends is a second direction intersecting with the first direction (depth direction in FIG. 4). The second protective wall 70 has a standing surface 72 on the side that is opposite to the second base end surface 71 in the standing direction of the second protective wall 70. The standing surface 72 has a horizontal surface 73 that has a rear end connected to the first protective wall 60 and that horizontally extends to the front of the vehicle from the first protective wall 60. A curved surface 74 is connected to the front end of the horizontal surface 73. A first curved surface 74A, a second curved surface 74B, and a third curved surface 74C constitute the curved surface 74. The first curved surface 74A extends downward in a curved shape from the front end of the horizontal surface 73. The second curved surface 74B is connected to the lower end of the first curved surface 74A and extends in a curved shape to the front of the vehicle. The third curved surface 74C is connected to the front end of the second curved surface 74B and extends downward of the vehicle in a curved shape. In other words, in the side view that is illustrated in FIG. 4, the first curved surface 74A has an arc shape and is convex upward, the second curved surface 74B has an arc shape and is concave downward, and the third curved surface 74C has an arc shape and is convex upward. The first curved surface 74A, the second curved surface 74B, and the third curved surface 74C have the same radius of curvature. A front side surface 75 extending vertically downward is connected to the third curved surface 74C. By being provided with the first curved surface 74A, the second curved surface 74B, and the third curved surface 74C, the curved surface 74 on the standing surface 72 of the second protective wall 70 is concave on the second base end surface 71 side and becomes closer to the second base end surface 71 side as it becomes farther from the first protective wall 60.

A support wall 80 is connected to the end portion of the second protective wall 70 on the side that is opposite to the first protective wall 60. The support wall 80 stands on the connecting wall 51 and its connecting surface 81 on the connecting wall 51 side extends in the second direction. The rear end portion of the support wall 80 that is its end portion on the second protective wall 70 side has a height H1 in the standing direction of the support wall 80 (up-down direction in FIG. 4) gradually increasing toward the second protective wall 70 side. The height H1 of the support wall 80 is less than a height H2 of the second protective wall 70 in its standing direction (H1<H2). As illustrated in FIG. 3, the front end of the support wall 80 extends up to almost the same position as the center of the through-hole 53 in the front-rear direction of the vehicle.

Figure 5:
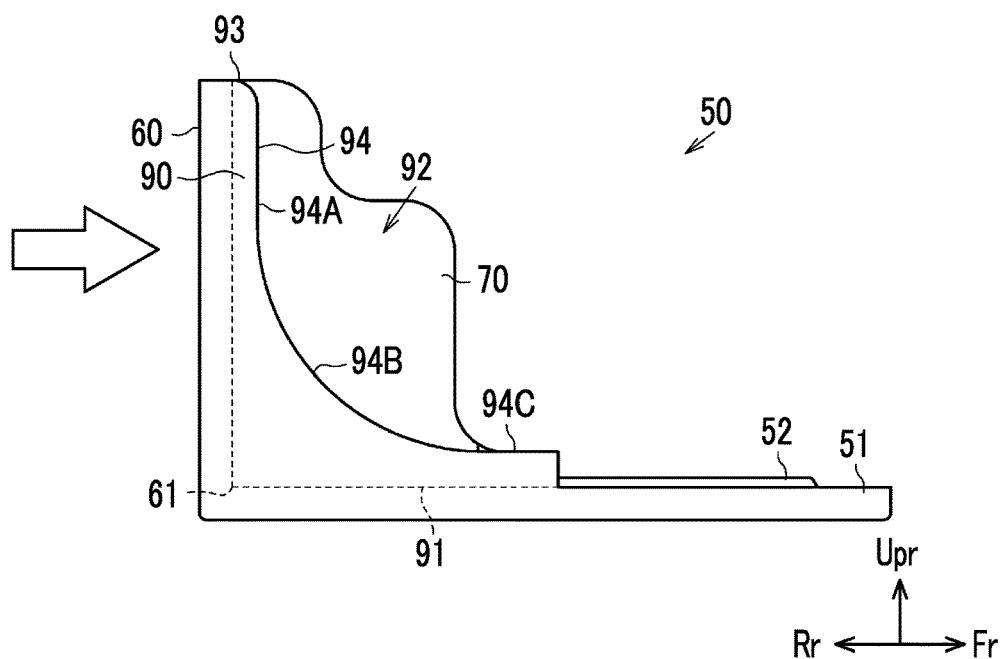
FIG. 5 is a right side view of the protector illustrated in FIG. 3.

The third protective wall 90 has a third base end surface 91 on the connecting wall 51 side and the third base end surface 91 extends from the second end portion of the first protective wall 60 in the front-rear direction of the vehicle (right-left direction in FIG. 5) as illustrated in FIGS. 3 and 5. The front-rear direction of the vehicle in which the third base end surface 91 extends is a third direction intersecting with the first direction (depth direction in FIG. 5). In the present embodiment, the second and third directions are the same direction and are the front-rear direction of the vehicle alike.

As illustrated in FIG. 5, the third protective wall 90 has a tip surface 92 on the side that is opposite to the third base end surface 91 in the standing direction of the third protective wall 90. The tip surface 92 has a horizontal surface 93 that has a rear end connected to the first protective wall 60 and that horizontally extends to the front of the vehicle from the first protective wall 60. A curved surface 94 is connected to the front end of the horizontal surface 93. A descending surface 94A, a fourth curved surface 94B, and a front extending surface 94C constitute the curved surface 94. The descending surface 94A extends downward from the front end of the horizontal surface 93. The fourth curved surface 94B is connected to the lower part of the descending surface 94A, has an arc shape, and is concave downward. The front extending surface 94C extends to the front of the vehicle (rightward in FIG. 5) from the front end of the fourth curved surface 94B. By being provided with the descending surface 94A, the fourth curved surface 94B, and the front extending surface 94C, the curved surface 94 on the tip surface 92 of the third protective wall 90 is concave on the third base end surface 91 side and becomes closer to the third base end surface 91 side as it becomes farther from the first protective wall 60. The radius of curvature of the fourth curved surface 94B is larger than the radius of curvature of the first curved surface 74A, the second curved surface 74B, and the third curved surface 74C. As illustrated in FIG. 3, the front end of the front extending surface 94C extends up to almost the same position as the center of the through-hole 53 in the front-rear direction of the vehicle.

In the present embodiment, the protector 50 is, for example, made of iron and manufactured by casting. Accordingly, the connecting wall 51, the first protective wall 60, the second protective wall 70, and the third protective wall 90 are integrally molded.

As illustrated in FIGS. 1 and 2, the flange 24 of the fuel pump 20 is put on the pedestal 52 from above in a state where the connecting wall 51 of the protector 50 is placed on the upper surface of the cylinder head cover 11. Then, the connecting wall 51 is disposed between the flange 24 of the fuel pump 20 and the cylinder head cover 11. In this state, bolts 100 inserted into the bolt insertion holes in the flange 24 and the bolt holes 57 in the connecting wall 51 are fastened to the cylinder head cover 11. As a result, the connecting wall 51 of the protector 50 is connected to the internal combustion engine. In a state where the fuel pump 20 is assembled, the accommodating body 21 of the fuel pump 20 and the through-hole 53 of the connecting wall 51 communicate with each other.

As illustrated in FIG. 2, the first protective wall 60, the second protective wall 70, and the third protective wall 90 of the protector 50 are disposed outside the pedestal 52, and thus are disposed outside the fuel pump 20. In other words, the first protective wall 60 is disposed behind the fuel pump 20 and the rear half of the accommodating body 21 of the fuel pump 20 is disposed between the second protective wall 70 and the third protective wall 90 in this state. The low-pressure fuel pipe 30 is connected to the accommodating body 21 from the front of the vehicle. Accordingly, the low-pressure fuel pipe 30 is less likely to interfere with each of the protective walls 60, 70, 90. The spill valve 23 is connected to the front half of the accommodating body 21 from the left-hand side in the width direction of the vehicle. Therefore, the spill valve 23 is also less likely to interfere with each of the protective walls 60, 70, 90. The high-pressure fuel pipe 40 is connected to the rear half of the accommodating body 21 from the right-hand side in the width direction of the vehicle. The curved surface 94 of the third protective wall 90 has a large radius of curvature, and thus the high-pressure fuel pipe 40 can be connected to the accommodating body 21 without interfering with the third protective wall 90 by passing above the curved surface 94. As described above, the setting of the standing height and the arrangement position of each of the protective walls 60, 70, 90 and the shapes of the curved surfaces 74, 94 depends on the installation position of the spill valve 23 of the fuel pump 20, the handling and assembly positions of each of the fuel pipes 30, 40, and so on.

The action and effect of the present embodiment will be described below. The internal combustion engine may be moved to the rear or one side of the vehicle as a result of a collision of the vehicle. The fuel pump 20 is disposed behind the internal combustion engine in the vehicle and on the left-hand side in the width direction of the vehicle. The protector 50 has the first protective wall 60 disposed behind the fuel pump 20 and the second protective wall 70 disposed on the left-hand side in the width direction of the vehicle, and thus interference of the fuel pump 20 with members disposed behind and to the left of the internal combustion engine is suppressed.

A load pressing the first protective wall 60 to the front of the vehicle acts, as indicated by the arrow that is illustrated in FIG. 4, when the first protective wall 60 comes into contact with a member disposed behind the internal combustion engine. The load is received by the second protective wall 70 connected to the first protective wall 60. In the present embodiment, the standing surface 72 of the second protective wall 70 of the protector 50 has the curved surface 74 that is concave on the second base end surface 71 side and that becomes closer to the second base end surface 71 side as it becomes farther from the first protective wall 60. In other words, as the standing surface 72 includes the curved surface 74 formed in a curved shape, stress can be dispersed to the standing surface 72 as well as the second base end surface 71 of the second protective wall 70 on the connecting wall 51 side when the load acting on the first protective wall 60 is received by the second protective wall 70. Accordingly, stress concentration on a part of the second protective wall 70 can be suppressed and the durability of the protector 50 can be improved.

The protector 50 also has the support wall 80 connected to the second protective wall 70. The connecting surface 81 of the support wall 80 extends in the second direction that is the same as the direction in which the second base end surface 71 of the second protective wall 70 extends. Accordingly, the load acting on the first protective wall 60 can be received by the support wall 80 as well as the second protective wall 70. Therefore, the stress that is generated in the second protective wall 70 can be further reduced.

The height H1 of the support wall 80 is less than the height H2 of the second protective wall 70, and thus the support wall 80 and each of the fuel pipes 30, 40 connected to the fuel pump 20 are less likely to interfere with each other.

The height H1 of the rear end portion of the support wall 80 in the standing direction of the support wall 80 gradually increases toward the second protective wall 70 side and the rear end portion of the support wall 80 is formed in a curved shape and concave on the connecting wall 51 side. Accordingly, stress concentration in the rear end portion of the support wall 80 is less likely to occur than in a configuration in which the height H1 of the support wall 80 is constant.

Therefore, the stress can be dispersed with ease to parts other than the second base end surface 71 and the standing surface 72 of the second protective wall 70 and the durability of the protector 50 can be further improved.

The protector 50 also has the third protective wall 90 connected to the first protective wall 60 and extending in the third direction. Accordingly, when the first protective wall 60 comes into contact with the member disposed behind the internal combustion engine and the load pressing the first protective wall 60 to the front of the vehicle acts as indicated by the arrow that is illustrated in FIG. 5, the load can be received by the third protective wall 90 as well as the second protective wall 70. Therefore, the stress that is generated in the second protective wall 70 can be further reduced.

The tip surface 92 of the third protective wall 90 has the curved surface 94 that is concave on the third base end surface 91 side and that becomes closer to the third base end surface 91 side as it becomes farther from the first protective wall 60. In other words, as the tip surface 92 is formed in a curved shape, the stress can be dispersed to the tip surface 92 as well as the third base end surface 91 of the third protective wall 90 when the load acting on the first protective wall 60 is received by the third protective wall 90. Accordingly, stress concentration on a part of the third protective wall 90 can be suppressed and the durability of the protector 50 can be further improved.

The radius of curvature of the fourth curved surface 94B is larger than the radius of curvature of the first curved surface 74A, the second curved surface 74B, and the third curved surface 74C. Accordingly, in terms of shape, the third protective wall 90 is cut more than the second protective wall 70 to the connecting wall 51 side. The fuel pump 20 is disposed on the left-hand side in the width direction of the vehicle, and thus the other members are less likely to interfere from the inner side (right-hand side) in the width direction of the vehicle even when the internal combustion engine is moved as a result of the collision of the vehicle. Therefore, an increase in the weight of the protector 50 can be suppressed and the durability of the protector 50 can be appropriately improved by the third protective wall 90 disposed inside the fuel pump 20 in the width direction of the vehicle being shaped as described above.

The embodiment can also be modified as follows. The shape of the tip surface 92 of the third protective wall 90 can be appropriately changed. For example, the radius of curvature of the fourth curved surface 94B may be equal to or less than the radius of curvature of the first curved surface 74A, the second curved surface 74B, and the third curved surface 74C. In addition, the curved surface 94 of the third protective wall 90 can have the same shape as the curved surface 74 of the second protective wall 70. In the configuration described above, the second protective wall 70 and the third protective wall 90 can have a bilaterally symmetrical configuration. Furthermore, the tip surface 92 of the third protective wall 90 may be configured to have the horizontal surface 93 alone without including the curved surface 94. In the configuration described above, the third protective wall 90 is formed in a rectangular plate shape.

The third direction in which the third base end surface 91 of the third protective wall 90 extends may be different from the second direction in which the second base end surface 71 of the second protective wall 70 extends. For example, the third base end surface 91 may extend at an angle to the front-rear direction of the vehicle such that it becomes farther from the second base end surface 71 as it becomes closer to the front side of the vehicle.

In the configuration exemplified above, the tip surface 92 of the third protective wall 90 is provided with one curved surface 94. However, the number of the curved surfaces may be two or more. For example, the tip surface 92 may be configured to include two curved surfaces aligned in the front-rear direction of the vehicle.

The third protective wall 90 of the protector 50 is optional. The protector 50 may also be configured to be provided with no third protective wall 90. The shape of the support wall 80 is not limited to that according to the embodiment described above. For example, the support wall 80 may be configured to have a constant height H1 in the front-rear direction of the vehicle. In addition, the height H1 may gradually increase toward the second protective wall 70 side from the front end portion to the rear end portion of the support wall 80. In the configuration described above, the upper surface of the front end portion of the support wall 80 has a curved shape and is concave on the connecting wall 51 side as well.

The support wall 80 of the protector 50 is optional. The protector 50 may also be configured to be provided with no support wall 80. The radius of curvature of each of the first curved surface 74A, the second curved surface 74B, and the third curved surface 74C of the second protective wall 70 can be changed as well. For example, the radius of curvature of the second curved surface 74B may be less than the radius of curvature of the first curved surface 74A and the third curved surface 74C or setting can be performed such that the radius of curvature of the first curved surface 74A, the radius of curvature of the second curved surface 74B, and the radius of curvature of the third curved surface 74C are different from one another.

The second direction in which the second base end surface 71 of the second protective wall 70 extends is not limited to the front-rear direction of the vehicle. For example, the second direction may also be a direction at an angle to the front-rear direction of the vehicle. In the configuration exemplified above, the standing surface 72 of the second protective wall 70 is provided with one curved surface 74. However, the number of the curved surfaces may be two or more as well. For example, the standing surface 72 may be configured to include two curved surfaces aligned in the front-rear direction of the vehicle.

Figure 6:
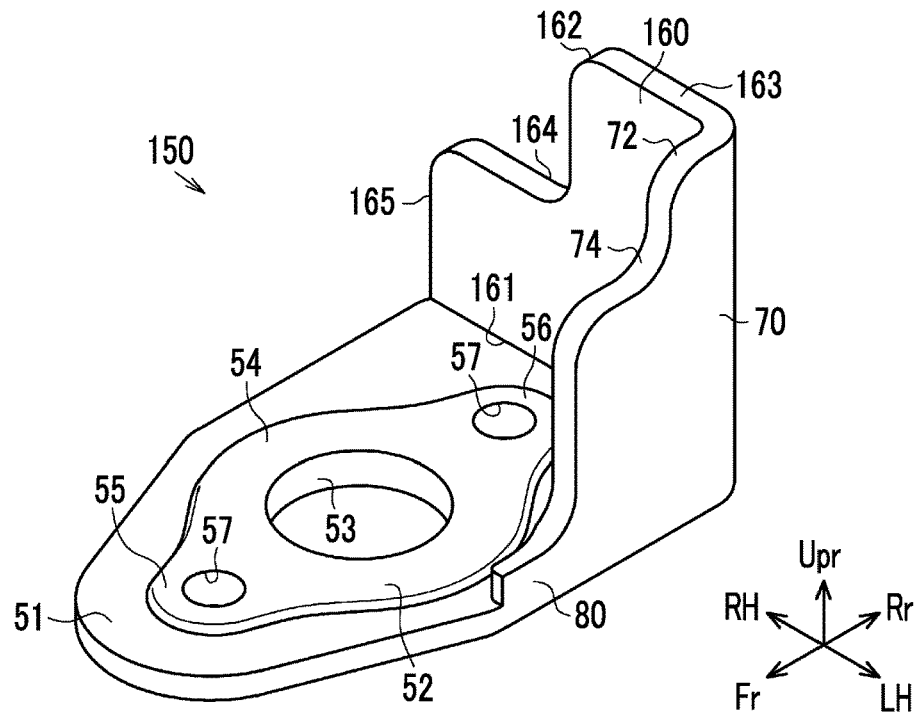
FIG. 6 is a perspective view schematically illustrating a configuration of a modification example of the protector.
Figure 7:
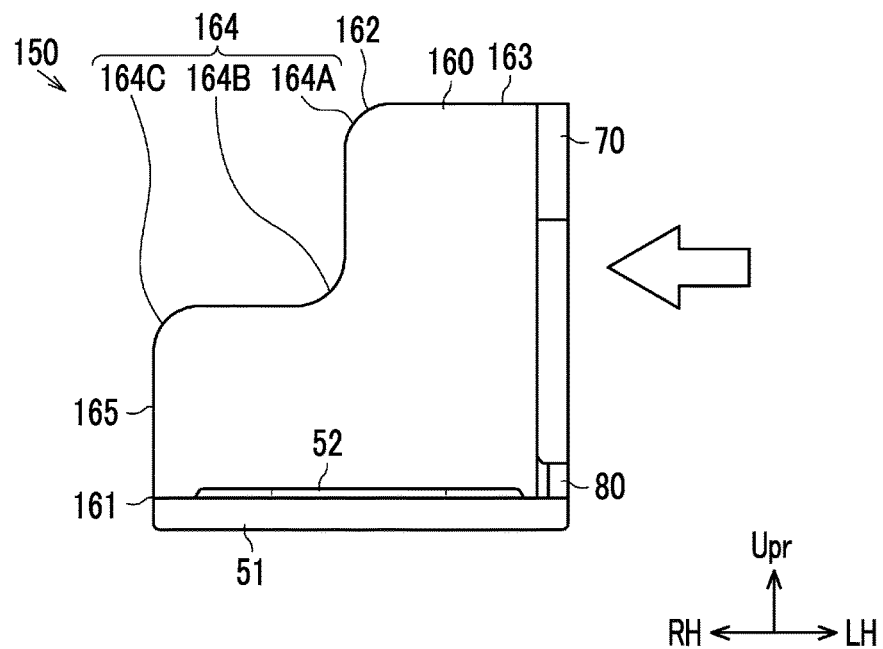
FIG. 7 is a front view of the protector illustrated in FIG. 6.

The configuration of the protector in the protective structure for the fuel pump is not limited to that according to the embodiment described above. For example, a protector that has the configuration which is illustrated in FIGS. 6 and 7 may be adopted instead. The same reference numerals will be used to refer to the configurations that are common to the protector illustrated in FIGS. 6 and 7 and the protector according to the embodiment, and description thereof will be omitted herein.

As illustrated in FIG. 6, a protector 150 has a first protective wall 160 and the second protective wall 70 standing on the connecting wall 51. The second protective wall 70 is connected to the left end portion of the first protective wall 160.

As illustrated in FIGS. 6 and 7, the first protective wall 160 has a first base end surface 161 on the connecting wall 51 side and the first base end surface 161 extends in the width direction of the vehicle as the first direction. The first protective wall 160 has a standing surface 162 on the side that is opposite to the first base end surface 161 in the standing direction of the first protective wall 160 (up-down direction in FIG. 7). The standing surface 162 has an upper end surface 163. The end portion of the upper end surface 163 that is on the left-hand side in the width direction of the vehicle is connected to the second protective wall 70 and the upper end surface 163 horizontally extends from the second protective wall 70 to the right-hand side in the width direction of the vehicle. A curved surface 164 is connected to the end portion of the upper end surface 163 that is on the right-hand side.

A fifth curved surface 164A, a sixth curved surface 164B, and a seventh curved surface 164C constitute the curved surface 164. The fifth curved surface 164A extends downward in a curved shape from the end portion of the upper end surface 163 that is on the right-hand side. The sixth curved surface 164B is connected to the lower end of the fifth curved surface 164A and extends in a curved shape to the right-hand side in the width direction of the vehicle. The seventh curved surface 164C is connected to the end portion of the sixth curved surface 164B that is on the right-hand side and extends downward of the vehicle in a curved shape. In other words, in the front view that is illustrated in FIG. 7, the fifth curved surface 164A has an arc shape and is convex upward, the sixth curved surface 164B has an arc shape and is concave downward, and the seventh curved surface 164C has an arc shape and is convex upward. The fifth curved surface 164A, the sixth curved surface 164B, and the seventh curved surface 164C have the same radius of curvature. A right side surface 165 extending vertically downward is connected to the seventh curved surface 164C. By being provided with the fifth curved surface 164A, the sixth curved surface 164B, and the seventh curved surface 164C, the curved surface 164 on the standing surface 162 of the first protective wall 160 is concave on the first base end surface 161 side and becomes closer to the first base end surface 161 side as it becomes farther from the second protective wall 70.

A load pressing the second protective wall 70 to the right-hand side in the width direction of the vehicle acts, as indicated by the arrow that is illustrated in FIG. 7, when the second protective wall 70 comes into contact with a member disposed to the left of the internal combustion engine. The load is received by the first protective wall 160 connected to the second protective wall 70. In the present embodiment, the standing surface 162 of the first protective wall 160 of the protector 50 has the curved surface 164 that is concave on the first base end surface 161 side and that becomes closer to the first base end surface 161 side as it becomes farther from the second protective wall 70. In other words, as the standing surface 162 includes the curved surface 164 formed in a curved shape, stress can be dispersed to the standing surface 162 as well as the first base end surface 161 of the first protective wall 160 on the connecting wall 51 side when the load acting on the second protective wall 70 is received by the first protective wall 160. Accordingly, stress concentration on a part of the first protective wall 160 can be suppressed and the durability of the protector 150 can be improved.

The fuel pump 20 may be fixed to the end portion of the cylinder head cover 11 that is on the rear side of the vehicle and the right-hand side in the width direction of the vehicle instead of being fixed to the end portion of the cylinder head cover 11 that is on the rear side of the vehicle and the left-hand side in the width direction of the vehicle as described above. In this case, a member disposed behind the internal combustion engine and a member disposed on the right-hand side of the internal combustion engine in the width direction of the vehicle are likely to interfere with the fuel pump 20. In a case where the protector 50 that has the configuration which is illustrated in FIGS. 6 and 7 is adopted, the protective structure for the fuel pump 20 can be realized and the durability of the protector 50 with respect to loads from the rear of the vehicle and the right side of the vehicle can be improved at the same time even in that case by the first protective wall 160 being disposed on the right-hand side of the fuel pump 20 in the width direction of the vehicle and the second protective wall 70 being disposed behind the fuel pump 20 in the vehicle. Accordingly, the protectors 50 with different configurations do not have to be used depending on the disposition of the fuel pump 20 and communization of the protector 50 can be realized. It is a matter of course that the radius of curvature of each of the fifth curved surface 164A, the sixth curved surface 164B, and the seventh curved surface 164C can be changed in the configuration described above. In addition, a plurality of the curved surfaces 164 can be disposed on the standing surface 162 of the first protective wall 160 in the configuration described above.

The protective wall can stand over the entire circumference of the peripheral edge of the connecting wall 51 of the protector 50 as well. In other words, a configuration can also be adopted in which the entire circumference of the outer side of the fuel pump 20 is surrounded by the protective wall of the protector 50.

The aspect of the assembly of the protector to the cylinder head cover 11 is not limited to that according to the embodiment described above. For example, the protector can also be assembled to the cylinder head cover 11 without the connecting wall of the protector being disposed between the flange 24 of the fuel pump 20 and the cylinder head cover 11.

Figure 8:
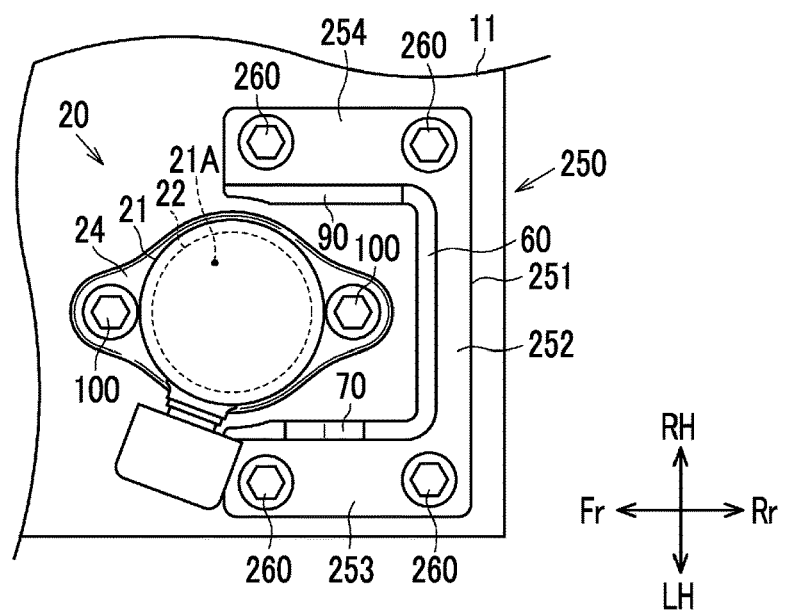
FIG. 8 is a plan view schematically illustrating a configuration of another modification example of the protector.

As illustrated in FIG. 8, a protector 250 has a connecting wall 251 that is formed in a C-shape in plan view. A rear extending portion 252, a first side extending portion 253, and a second side extending portion 254 constitute the connecting wall 251. The rear extending portion 252 is disposed behind the fuel pump 20 in the vehicle and extends in the width direction of the vehicle. The first side extending portion 253 and the second side extending portion 254 extend to the front of the vehicle from both end portions of the rear extending portion 252 in the width direction of the vehicle. The length of the rear extending portion 252 of the connecting wall 251 is set such that the fuel pump 20 is disposed between the first side extending portion 253 and the second side extending portion 254. The front ends of the first side extending portion 253 and the second side extending portion 254 extend up to almost the same position as the center of the accommodating body 21 of the fuel pump 20 in the front-rear direction of the vehicle.

The first protective wall 60 stands at the front end of the rear extending portion 252. The second protective wall 70 stands at the right end of the first side extending portion 253. The third protective wall 90 stands at the left end of the second side extending portion 254. In other words, the first protective wall 60, the second protective wall 70, and the third protective wall 90 of the protector 50 are disposed outside the fuel pump 20, the first protective wall 60 is disposed behind the fuel pump 20, and the rear half of the accommodating body 21 of the fuel pump 20 is disposed between the second protective wall 70 and the third protective wall 90. The protector 50 is assembled to the cylinder head cover 11 by bolts 260 inserted into bolt holes formed in the connecting wall 251 being fastened to the cylinder head cover 11. The fuel pump 20 is attached to the upper surface of the cylinder head cover 11 via the bolts 100 inserted into bolt holes in the flange 24. The same action and effect as (1) to (6) described above can be achieved from this configuration.

The second protective wall 70 is connected to the left-hand side of the first protective wall 60 in the width direction of the vehicle and the third protective wall 90 is connected to the right-hand side of the first protective wall 60 in the width direction of the vehicle. However, the disposition of the second protective wall 70 and the third protective wall 90 may also be reversed in the right-left direction. In other words, the second protective wall 70 may be connected to the right-hand side of the first protective wall 60 in the width direction of the vehicle and the third protective wall 90 may be connected to the left-hand side of the first protective wall 60 in the width direction of the vehicle.

The first direction in which the first base end surfaces 61, 161 of the first protective walls 60, 160 extend is not limited to the width direction of the vehicle. For example, the first direction may also be a direction at an angle to the width direction of the vehicle. In a case where the first direction is the front-rear direction of the vehicle, the second and third directions may be directions at an angle to the front-rear direction of the vehicle.

An example in which the protectors 50, 150, 250 are manufactured by casting has been described in the embodiment described above. However, methods for manufacturing the protector are not limited thereto. For example, the protector can also be manufactured by forging or cutting. In addition, the protector can also be configured by the connecting walls 51, 251, the first protective walls 60, 160, the second protective wall 70, and the third protective wall 90 being separately manufactured and integrally joined to one another. Furthermore, the material that constitutes the protectors 50, 150, 250 is not limited to iron. A metal other than iron may be used or a non-metal material, such as resin may be used instead.

A water drain hole can be formed in the connecting wall 51 of the protector 50. In the configuration described above, water is discharged to the outside from the protector 50 through the water drain hole in the connecting wall 51, and thus water retention in the protector 50 can be suppressed.

The disposition of the fuel pump 20 can be appropriately changed. For example, the fuel pump 20 can also be disposed on side surfaces of the cylinder head 10 and the cylinder head cover 11. Even in this case, the fuel pump 20 can be protected by the first protective walls 60, 160 and the second protective wall 70 of the protector 50 being disposed outside the fuel pump 20.

In the protective structure for a fuel pump according to the aspect of the present disclosure, the protector may include a support wall standing on the connecting wall with a connecting surface on the connecting wall side extending in the second direction, the height of the support wall in the standing direction of the support wall may be less than the height of the second protective wall in the standing direction, and the support wall may be connected to the end portion of the second protective wall on the side opposite to the first protective wall.

With the configuration described above, the support wall extending in the second direction is connected to the second protective wall. Accordingly, a load acting on the first protective wall can be received by the support wall as well as the second protective wall. Therefore, the stress generated in the second protective wall can be further reduced.

In the protective structure according to the aspect of the present disclosure, the end portion of the support wall on the second protective wall side may have a height in the standing direction of the support wall gradually increasing toward the second protective wall side.

With the configuration described above, the end portion of the support wall on the second protective wall side has a curved shape and is concave on the connecting wall side. Accordingly, stress concentration in the end portion of the support wall is less likely to occur than in a configuration in which the height of the support wall in the standing direction is constant. Therefore, stress can be dispersed with ease to parts other than the base end surface and the standing surface of the second protective wall and the durability of the protector can be further improved.

In the protective structure according to the aspect of the present disclosure, the protector may include a third protective wall standing on the connecting wall with a third base end surface on the connecting wall side extending from a second end portion of the first protective wall in the third direction intersecting with the first direction.

With the configuration described above, the load acting on the first protective wall can be received by the third protective wall as well as the second protective wall. Accordingly, the stress generated in the second protective wall can be further reduced. In the protective structure according to the aspect of the present disclosure, a tip surface of the third protective wall on the side opposite to the third base end surface in the standing direction of the third protective wall may include a second curved surface that is concave on the third base end surface side and that becomes closer to the third base end surface side as the curved surface becomes farther from the first protective wall.

With the configuration described above, the tip surface is formed in a curved shape, and thus stress can be dispersed to the tip surface as well as the third base end surface of the third protective wall when the load acting on the first protective wall is received by the third protective wall. Accordingly, with the configuration described above, stress concentration on a part of the third protective wall can be suppressed and the durability of the protector can be further improved.

What is claimed is:

1. A protective structure for a fuel pump, the protective structure comprising a protector including a connecting wall connected to an internal combustion engine, a first protective wall standing on the connecting wall with a first base end surface on the connecting wall side extending in a first direction, and a second protective wall standing on the connecting wall with a second base end surface on the connecting wall side extending from a first end portion of the first protective wall in a second direction intersecting with the first direction, the first protective wall and the second protective wall being disposed outside the fuel pump assembled to the internal combustion engine, and a standing surface of the second protective wall on a side opposite to the second base end surface in a standing direction of the second protective wall including a first curved surface that is concave on the second base end surface side and that becomes closer to the second base end surface side as the curved surface becomes farther from the first protective wall, wherein the protector has a support wall standing on the connecting wall with a connecting surface on the connecting wall side extending in the second direction, a height of the support wall in a standing direction of the support wall is less than a height of the second protective wall in the standing direction, and the support wall is connected to an end portion of the second protective wall on a side opposite to the first protective wall.

2. The protective structure for the fuel pump according to claim 1, wherein an end portion of the support wall on the second protective wall side has a height in the standing direction of the support wall gradually increasing toward the second protective wall side.

3. The protective structure for the fuel pump according to claim 1, wherein the protector includes a third protective wall standing on the connecting wall with a third base end surface on the connecting wall side extending from a second end portion of the first protective wall in a third direction intersecting with the first direction.

4. The protective structure for the fuel pump according to claim 3, wherein a tip surface of the third protective wall on a side opposite to the third base end surface in a standing direction of the third protective wall includes a second curved surface that is concave on the third base end surface side and that becomes closer to the third base end surface side as the curved surface becomes farther from the first protective wall.

5. A protective structure for a fuel pump, the protective structure comprising a protector including a connecting wall connected to an internal combustion engine, a first protective wall standing on the connecting wall with a first base end surface on the connecting wall side extending in a first direction, and a second protective wall standing on the connecting wall with a second base end surface on the connecting wall side extending from a first end portion of the first protective wall in a second direction intersecting with the first direction, the first protective wall and the second protective wall being disposed outside the fuel pump assembled to the internal combustion engine, and a standing surface of the second protective wall on a side opposite to the second base end surface in a standing direction of the second protective wall including a first curved surface that is concave on the second base end surface side and that becomes closer to the second base end surface side as the curved surface becomes farther from the first protective wall, wherein the protector includes a third protective wall standing on the connecting wall with a third base end surface on the connecting wall side extending from a second end portion of the first protective wall in a third direction intersecting with the first direction, and a tip surface of the third protective wall on a side opposite to the third base end surface in a standing direction of the third protective wall includes a second curved surface that is concave on the third base end surface side and that becomes closer to the third base end surface side as the curved surface becomes farther from the first protective wall.

* * * * *